(12) United States Patent
Mamandoor AnanthaNarayanan (10) Patent No.: US 9,578,203 B2
(45) Date of Patent: Feb. 21, 2017

(54) DOCUMENT PRODUCTION SYSTEM HAVING AUTOMATIC ADJUSTMENT OF CONTENT TO FIT THE PAGE MARGIN OF A PRE-PRINTED MEDIA

(71) Applicant: Xerox Corporation, Norwalk, CT (US)

(72) Inventor: Gopalan Mamandoor AnanthaNarayanan, TamilNadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/159,971

(22) Filed: May 20, 2016

(65) Prior Publication Data
US 2016/0269593 A1 Sep. 15, 2016

Related U.S. Application Data

(63) Continuation of application No. 14/594,738, filed on Jan. 12, 2015, now Pat. No. 9,392,127.

(51) Int. Cl.
| | |
|---|---|
| *G06K 15/02* | (2006.01) |
| *H04N 1/387* | (2006.01) |
| *H04N 1/393* | (2006.01) |
| *H04N 1/00* | (2006.01) |
| *H04N 1/23* | (2006.01) |
| *G06F 3/12* | (2006.01) |
| *H04N 1/40* | (2006.01) |
| *G06K 9/36* | (2006.01) |

(52) U.S. Cl.
CPC ............ *H04N 1/393* (2013.01); *G06F 3/1204* (2013.01); *G06F 3/1239* (2013.01); *G06F 3/1243* (2013.01); *G06K 15/1843* (2013.01); *G06K 15/1868* (2013.01); *H04N 1/00005* (2013.01); *H04N 1/00013* (2013.01); *H04N 1/00015* (2013.01); *H04N 1/00045* (2013.01); *H04N 1/00708* (2013.01); *H04N 1/00816* (2013.01); *H04N 1/2384* (2013.01); *H04N 1/3872* (2013.01); *H04N 1/3877* (2013.01); *H04N 2201/0094* (2013.01)

(58) Field of Classification Search
CPC .............. H04N 1/4177; H04N 1/00045; H04N 1/00005; H04N 1/00013; H04N 1/00015; H04N 1/2384; H04N 1/3877; H04N 1/393; H04N 1/32144; G06F 3/1242; G06F 3/1243; G06F 17/243; G06F 3/1204; G06F 3/1239; G06K 15/1822; G06K 15/1843; G06K 15/1868; G06K 9/2054; G06K 9/20; G06K 9/00449
USPC .............. 358/1.11–1.18, 505, 537–540, 452, 453,358/462, 488; 382/103, 112, 173–180
See application file for complete search history.

(56) References Cited

U.S. PATENT DOCUMENTS

| | | |
|---|---|---|
| 5,361,134 A | 11/1994 | Hu et al. |
| 5,491,759 A | 2/1996 | Nagao et al. |

(Continued)

*Primary Examiner* — Chad Dickerson
(74) *Attorney, Agent, or Firm* — Fox Rothschild LLP (57) ABSTRACT

A document production system having the capability of determining the printable area of a pre-printed media is disclosed. The system may include a scanner, which scans and analyzes a copy of the pre-printed media as a template. The system may determine the page margin of the template, including the side margin, the header or the footer. The system may determine the printable area of the template based on the page margin and adjust the content of the document to be printed to fit the printable areas by either scaling or cropping.

16 Claims, 8 Drawing Sheets

(56) References Cited

U.S. PATENT DOCUMENTS

| | | | |
|---|---|---|---|
| 5,513,277 A * | 4/1996 | Huttenlocher | G06K 9/34 382/171 |
| 5,784,487 A * | 7/1998 | Cooperman | G06K 9/00469 382/112 |
| 6,005,683 A | 12/1999 | Son et al. | |
| 6,922,487 B2 | 7/2005 | Dance et al. | |
| 7,283,274 B2 * | 10/2007 | Sharma | A01H 5/0222 358/1.1 |
| 7,446,896 B2 | 11/2008 | Barrios | |
| 7,797,631 B2 * | 9/2010 | Yoshida | G06K 15/02 345/467 |
| 8,103,490 B2 | 1/2012 | Voirin et al. | |
| 8,384,918 B2 | 2/2013 | Zhan | |
| 2006/0136450 A1 | 6/2006 | Barrus et al. | |
| 2007/0024872 A1 * | 2/2007 | Salgado | G06F 3/1287 358/1.1 |
| 2007/0076278 A1 * | 4/2007 | Nagarajan | H04N 1/387 358/538 |
| 2009/0073476 A1 * | 3/2009 | Torikoshi | H04N 1/00236 358/1.13 |
| 2014/0152849 A1 | 6/2014 | Bala et al. | |

* cited by examiner

DOCUMENT PRODUCTION SYSTEM HAVING AUTOMATIC ADJUSTMENT OF CONTENT TO FIT THE PAGE MARGIN OF A PRE-PRINTED MEDIA

RELATED APPLICATIONS

This patent document is a continuation of U.S. patent application Ser. No. 14/594,738 filed Jan. 12, 2015, the disclosure of which is incorporated herein by reference in its entirety.

BACKGROUND

This document relates generally to the field of multi-function devices (MFDs), and, in particular, to printers, scanners and devices having both printing and scanning capabilities and to the printing of documents using templates with pre-defined printable areas using those devices.

It is common practice and well known in the art to print documents, such as letters, certificates and forms using pre-printed media or media printed locally which contain markings not typically considered part of the content of the document being printed. For example, a company may have letterhead paper pre-printed with the company's logo, trademark, or other graphic along with other information, such as the company's address. Such markings often appear in the margins of the page (top, bottom, left or right margins) and are often pre-printed or printed locally when a document requires such information.

A problem arises when using media having pre-printed or locally printed markings. Soft copies of documents to be printed on pre-printed media are often created using word-processing software, which does not display the pre-printed areas of the physical media. As such, a user may be unaware of where on a given page content may be placed. This often leads to a trial-and-error process of producing a document having the correct spacing, causing the user to print out multiple copies of the document before a correctly formatted document is achieved, resulting in a waste of resources and time. Furthermore, the user must manually adjust header, footer and margins of the softcopy of the document to fit into the printable area. This is often an advanced function that may be beyond the capability of casual users of the word processing software.

Therefore, it would be desirable to make the process of fitting documents onto pre-printed media easier and more foolproof.

SUMMARY

This document describes a system and process for addressing at least some of the difficulties described above. Users are able present a template document, either by scanning it in a scanner or the scanning portion of a multi-function device (MFD), or by providing a filename of a soft copy template document. The template document is simply a copy of a page of the pre-printed media that has not yet been printed. Once the template is scanned, the printable area of the pre-printed media is algorithmically determined. The content that the user wishes to add is then scaled in size to fit the printable area, or, if the reduction in size renders the content illegible, is cropped such as to fit on multiple pages.

The system may be implemented as software either running on a processor connected to a scanner and printer or an MFD, typically as part of the device driver software, or as firmware in an MFD.

DETAILED DESCRIPTION

An "operation" or "print-related function" is a function that is performed on a print job. Exemplary operations may include raster image processing, formatting, stapling, collating, sorting, punching, binding and/or the like.

A "pre-printed media" as used herein refers to a hardcopy page having print markings thereon. An example of a pre-printed media would be a paper having a letterhead pre-printed thereon. Pre-printed media may have pre-printed markings in the header, footer, left or right margins of the page.

A "computing device" refers to a device that includes a processor and non-transitory, computer-readable memory. The memory may contain programming instructions that, when executed by the processor, cause the computing device to perform one or more operations according to the programming instructions. As used in this description, a "computing device" may be a single device, or any number of devices having one or more processors that communicate with each other and share data and/or instructions. Unless the context specifically dictates otherwise, the term "processor" will include embodiments having a single processor, as well as embodiments in which multiple processors collectively perform various steps of a process. Examples of computing devices and/or electronic devices include personal computers, servers, mainframes, gaming systems, televisions, and portable electronic devices such as smartphones, personal digital assistants, cameras, tablet computers, laptop computers, media players, peripherals, such as printers, scanners and multi-function devices and the like.

In this document, the term "multi-function device" or "MFD", refers to a computing device comprising hardware and associated software configured for printing, as well as at least one other function such as copying, facsimile transmitting or receiving, scanning, or performing other actions on document-based data. In particular, the MFDs used in this application will be configured at least for printing and scanning.

A "printer" refers to any apparatus, such as a digital copier, bookmaking machine, facsimile machine, multi-function machine and the like, which performs a print outputting function for any purpose. As used herein, the term "printer" means a stand-alone printer or the printing portion of a multi-function device.

A "scanner" refers to any apparatus which performs the function of reading a hard copy of a document and outputting a copy of the document in digital form, regardless of the format of such output. A scanner can be a flatbed scanner, a scanner which scans papers as they are fed through the machine and/or multi-function device. As used herein, the term "scanner" means a stand-alone scanner or the scanning portion of a multi-function device.

A "soft copy" of a document refers to a document stored on a storage medium in digital form, regardless of format.

The "printable area" of a page, as used herein, refers to the area of a pre-printed media in which content can be printed without interfering with pre-printed markings on the media.

The figures and associated discussion below describe an embodiment which implements a process for automatically determining the printable area of a document, typically pre-printed media such as a letterhead or certificate, and which thereafter automatically formats the user's content to fit within the printable area of the pre-printed media. The printable area of the pre-printed media is determined utilizing a template either in hardcopy form, which is scanned and analyzed, or in softcopy form, which is read from a file stored on a computer-accessible storage medium and analyzed.

The process may be implemented by software running on a typical computing device, such as a personal computer having a processor, memory, display and storage capability. Optionally, the software implementing the process may be executed as part of a device driver for a scanner and/or printer, or for a multi-function device. Alternatively, the process may be implemented by firmware running on a printer and/or a scanner, or on a multifunction device. In yet another embodiment, the process may be offered as an online service.

The process and system may be used, for example, in cases where the user wishes to print out content on a page having pre-printed markings thereon, such as company letterhead, which may appear in the top header or bottom footer of the pre-printed media. The process and system also may be useful in cases where pre-printed markings appear in the left or right hand margins of the preprinted media. Typically, when a user is creating or editing a document using word processing application, the pre-printed areas of the hard media on which the document is to be printed will not be visible to the user, making it The process may help solve the problem of the user not being able to view the areas of the page with pre-printed markings while utilizing a word processing application to create or edit a soft copy of the document. Typically, such a word processing application would have no knowledge of the pre-printed markings on the hard copy page on which the content is to be printed. This makes it difficult for an untrained or unsophisticated user to determine where the printable, usable area of the document lies. In such cases, the user would typically need to manually adjust the soft copy of the document to accommodate the markings on the pre-printed media, which can be a problem for untrained or unsophisticated users. Typically, the user will need to print out the document several times in a trial-and-error fashion before the content can successfully and correctly be positioned for printing in the usable area of the pre-printed media. In another scenario, the source document holding the content that the user wishes to print may be uneditable, as in cases where the document is locked or in read-only form, thereby preventing the user from make the appropriate adjustments to fit the content into the printable area of the pre-printed media.

Figure 1:
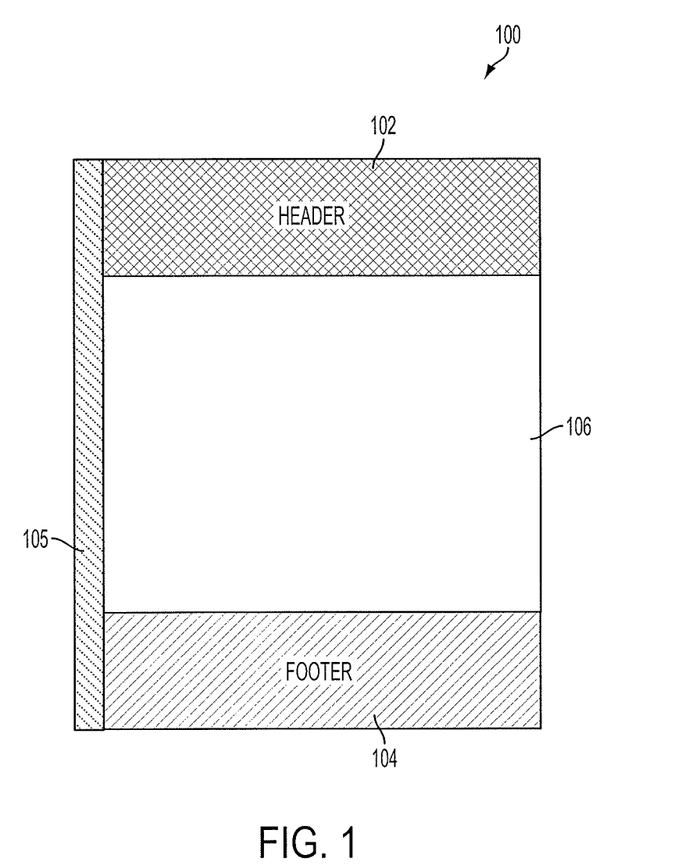
FIG. 1 is a typical template of a pre-printed media having markings in pre-defined areas.
Figure 2:
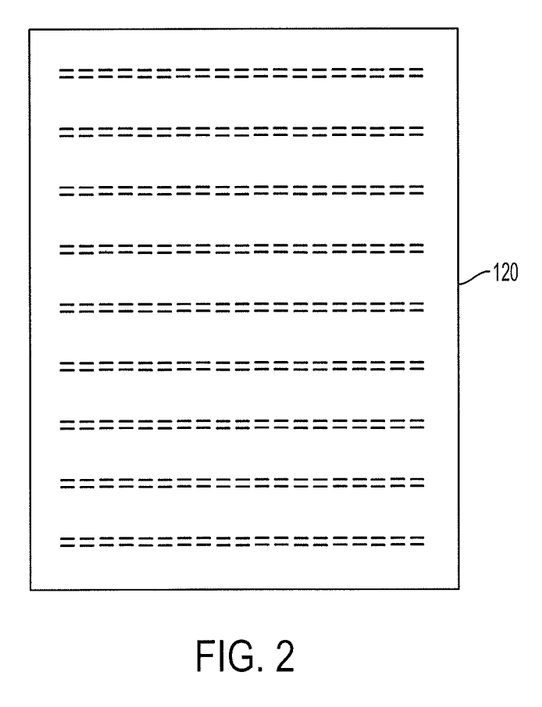
FIG. 2 is a softcopy of a document having content which is to be placed into the printable area of a document when the template of FIG. 3 is used.

In an embodiment, the process and system described below can help solve the problem by having the user scan a template of the pre-printed media having the markings thereon. In this case the template can be a hard copy of the pre-printed media. An example of such a template is shown in FIG. 1 showing pre-printed media 100 having a header 102, a footer 104 and a side margin 105. These areas of the template are considered unprintable as any printing of content in this area may interfere with the pre-printed markings on the media. The printable area of the media is thus shown with reference number 106 in FIG. 1. The user's content, which is desired to be printed within printable area 106 is shown in FIG. 2 as reference number 120.

In one embodiment, wherein the steps of the process are implemented as software which is part of the printer driver, the user will request to have a soft copy 120 of a document printed, selecting the paper source as the tray in the printer holding the pre-printed media. An option is provided in the print to fit the content into the printable area of the pre-printed media which, if selected, will the cause the computer to hold the print job and request the user to scan a copy of the pre-printed media 100. The pre-printed media can be scanned, using either a scanner connected to or accessible from the user's personal computer, or a scanner as part of a MFD which includes the intended printer. This process is shown schematically in FIG. 3, and the resulting internal copy of the scanned preprinted media will include a header of known size 102', a footer of known size 104', and a left margin of known size 105', leaving the printable area of known size 106'. The printable area 106' of the pre-printed media can therefore be calculated as Printable Area (PA)=Page Size (PS)−Header Size (*H*)−Footer Size (*F*)

When the pre-printed media is scanned, the intensity of the light emitted and detected by the scanning head varies as it passes through the header and footer portions of the paper, as opposed to when it is passing through white space. For scanners using a motor to drive the light source rotating about an axis as it is scans, when the variation of light is detected, the angle of rotation of the motor is noted. The angular rotation of the motor can be translated into a linear distance, and this distance is the size of the header from the top of the document. In general, the formula for the header size can be given by the formula (x/360)×length of the paper. It should be noted that the variation in intensity of the detected light will also be noted for the footer of the page and as such the angle of rotation of the motor should be noted as this variation begins and again be noted at the completion of the scanning of the page. Thus, the size of the footer can be calculated utilizing the same formula as above wherein x equals the total rotational angle of the motor from the beginning of the footer until the end of the page. This procedure requires that the printer driver know the size of the page being printed on which may already be known or may be specified by the user.

For scanners not having the feature of a motor rotating the paper about an axis (i.e., a flatbed scanner), the preprinted media may be scanned to a soft copy and the procedure for a soft copy of the preprinted media outlined below must be used. It should also be noted that if the user desires to detect the size of the left and right margins of the paper having pre-printed markings therein, it would be necessary to scan the page twice, once in portrait mode and once in landscape mode. If it is not possible to scan in landscape mode, a flatbed scanner may be used to scan the pre-printed media into a soft copy and analyze it as discussed below.

Figure 3:
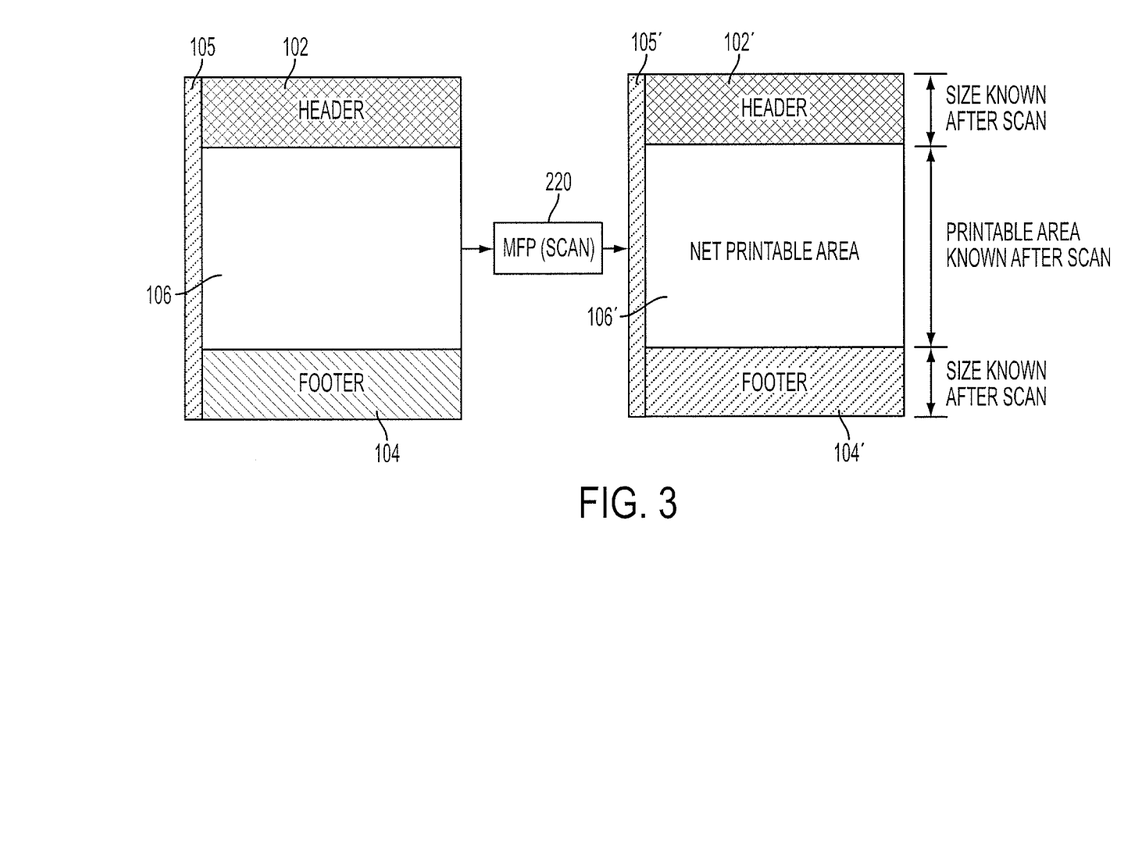
FIG. 3 shows the scanning of the template and the determination of the printable area of a document using that template.

In a first embodiment, the scanning can be performed by an outboard scanner or by a MFD having a scanning capability as shown as reference number 220 in FIG. 3.

In a second embodiment, a soft copy of the pre-printed media may already be resident on the computer implementing the process and, as such, the user, instead of scanning the pre-printed media utilizing a scanner, may specify the location of a file containing the soft copy of the pre-printed media. When a soft copy of the pre-printed media is used to determine the printable area of the pre-printed media, an image segmentation algorithm and/or a projection profile based algorithm is used to discover the areas of the pre-printed media having pre-printed markings. These algorithms are well known in the art.

Figure 4:
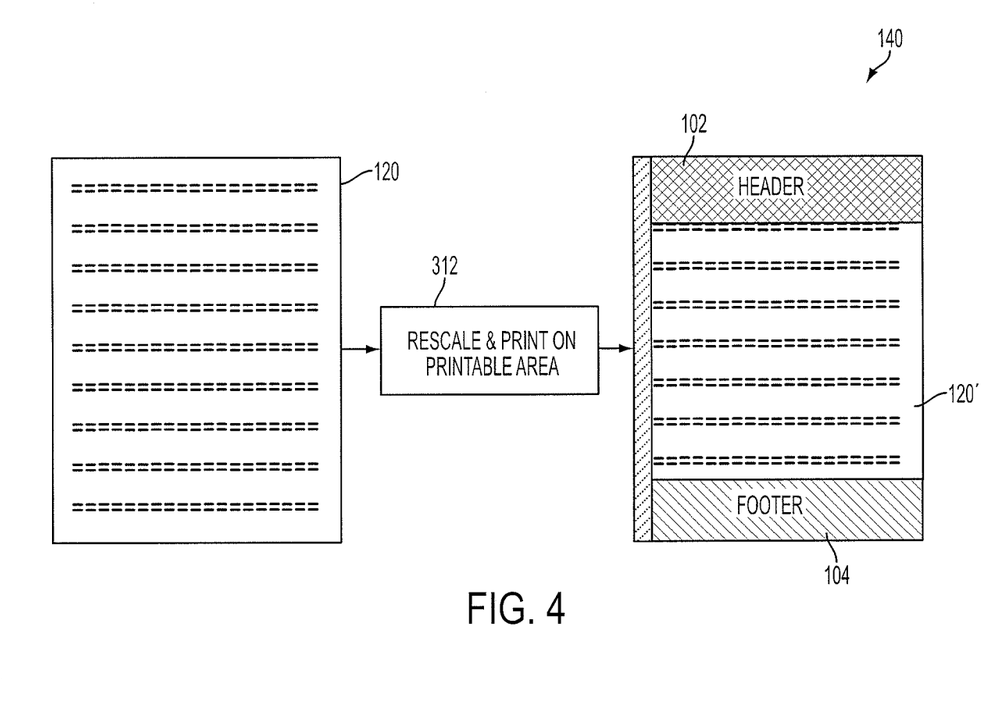
FIG. 4 shows the resealing of the user's document to fit the printable area of a document using the template of FIG. 3.

The system utilizes one of two possible ways of fitting the user's content 120 into the printable area of 106 of pre-printed media 100. The first way is shown in FIG. 4, wherein the user's content 120 is rescaled to fit printable area 106. The scaled user content is shown in FIG. 4 as reference 120'. It is desired that the scaling of the user's content 120 result in a still-legible version of the original. Process 312 is responsible for the scaling. After the scaling is completed, the process algorithmically determines whether or not the scaled content 120' is legible. To determine legibility, the font size of the scaled content 120' is determined by connected component based segmentation. If the font size in the scaled content 120' prime is determined to be greater than a minimum readable value, then content 120' is placed into the printable areas 106 of the document, resulting in document 140, and printed.

Figure 5:
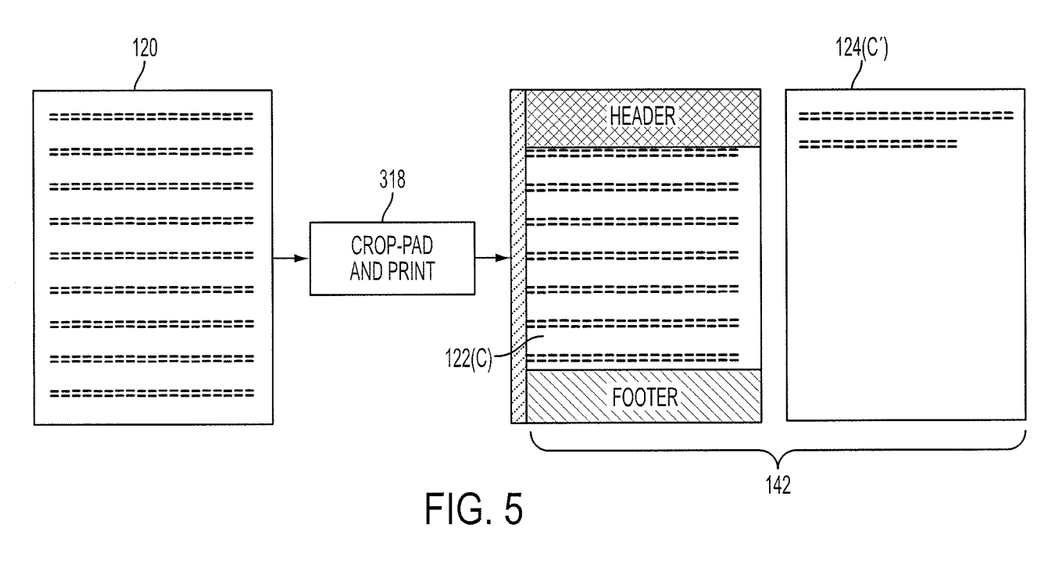
FIG. 5 shows the cropping of the user's document to fit the printable area of a document using the template of FIG. 3.

FIG. 5 shows the process which is used when the scaling of the user's content would result in a font size which falls below a minimum readable value, and therefore cannot be printed. In such cases, the user's content 120 is cropped and as much of the content as possible is fitted into area 106 of the preprinted media. For page N of the document, we will call this portion $C_N$ and is shown by reference number 122 in FIG. 5. The remainder of the content, referred to as $C'_N$, shown as reference number 124 in FIG. 5, must be pushed to page N+1, thereby leaving less room for the content 120 of page N+1 to be printed. Thus, the size of the content $C_N$ for any given page N can be calculated by the formula:

$$C_N = PS - H - F - C'_{N-1}$$

where $C'_{N-1}$ is the leftover content from the previous page. This results in document 142, which is then printed. This process is repeated for each page in the document to be printed.

Figure 6:
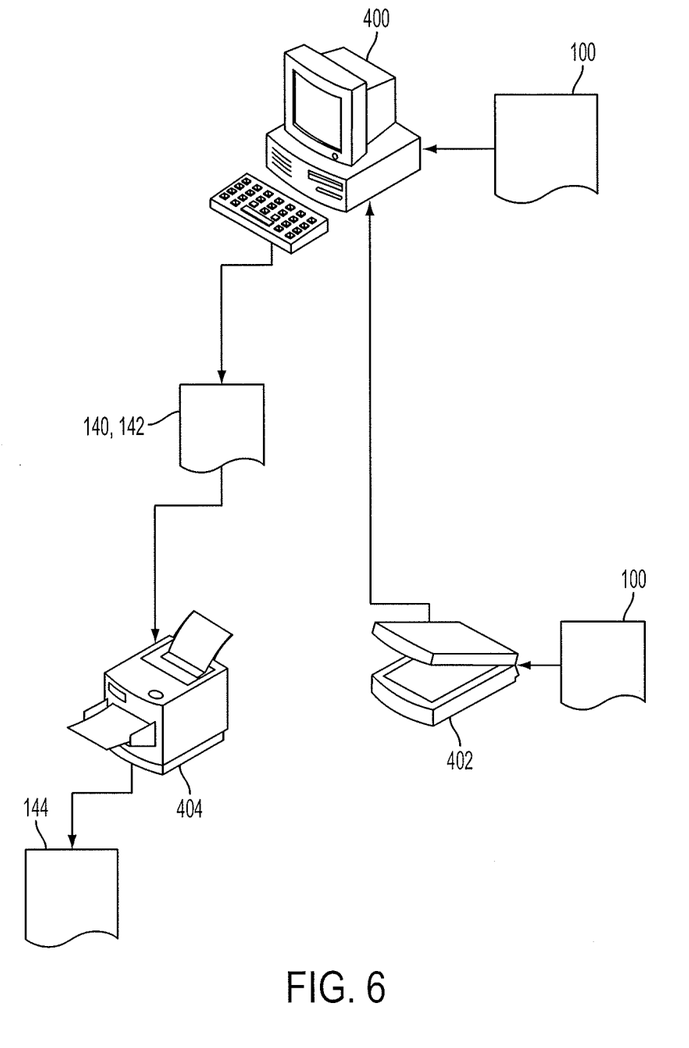
FIG. 6 is a schematic depiction of a first embodiment using separate printer and scanner devices.

FIG. 6 shows a first hardware implementation of the system wherein the printer 404 and scanner 402 are separate. Computer 400 is utilized by the user to create the soft copy of the document and initiate printing of the document. The pre-printed media 100 may be scanned by scanner 402 or, as previously discussed, a soft copy of the template may be readily available on computer 400, or accessible by computer 400, for example, stored locally or in cloud storage. In the embodiment wherein the software implementing the process is part of the printer driver running on computer 400, the user may select as an option the functions of the system to allow the automatic fitting of the document into the printable area 106 of the preprinted media. After the software in computer 400 has configured the document either by scaling, resulting in document 140, or by cropping, resulting in document 142, the soft copy of the document is sent to printer 404, where it is printed as hard copy 144.

Figure 7:
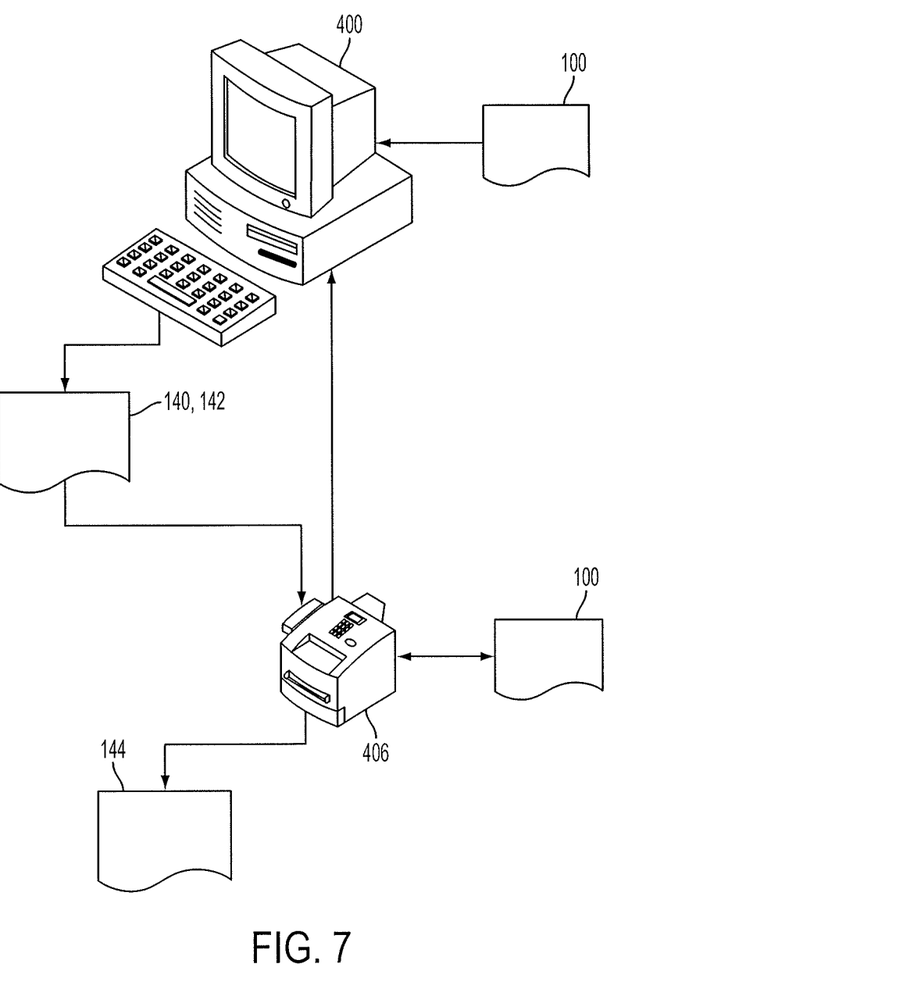
FIG. 7 is a schematic depiction of a second embodiment using an MFD having printing and scanning capabilities.

FIG. 7 shows the alternate hardware embodiment of the system wherein the printer and scanner functions are combined into an MFD 406. The embodiment in FIG. 7 operates substantially the same as the embodiment in FIG. 6. In the embodiment in FIG. 7, it may be possible to have the software implementing the process running on either computer 400, preferably as part of one or more device drivers, or as firmware in MFD 406. In other embodiments, the process may be implemented as a cloud service or online application.

Figure 8:
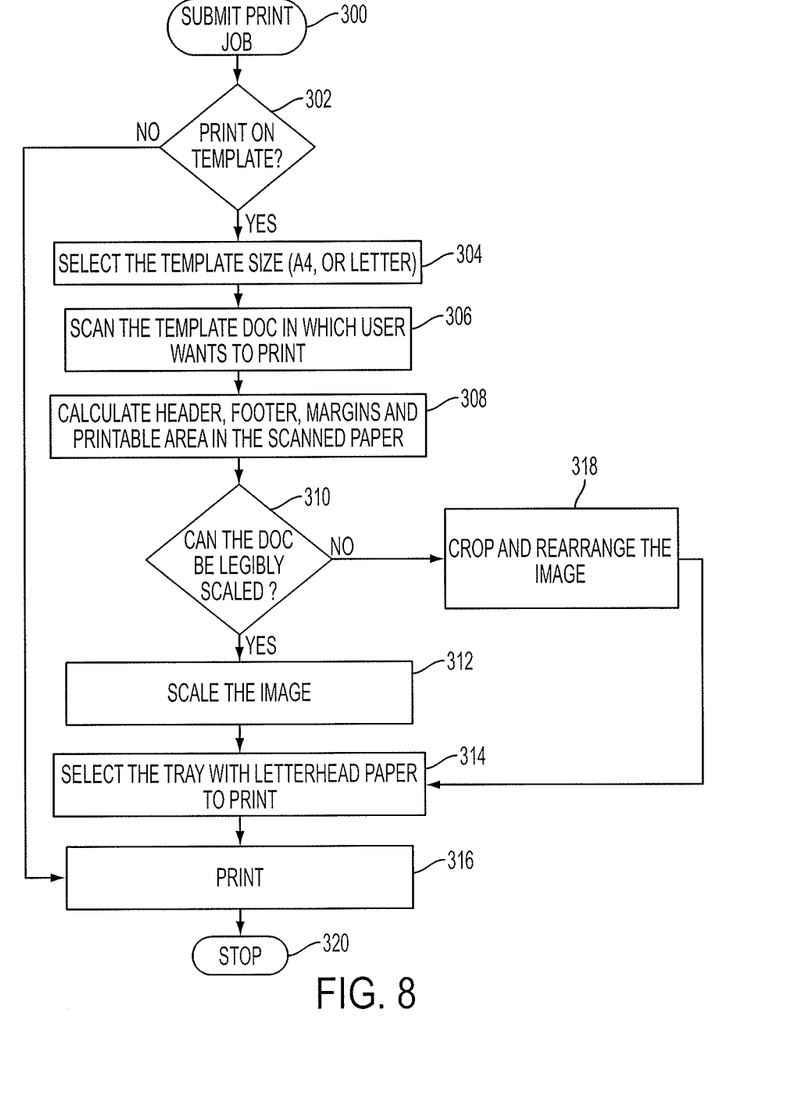
FIG. 8 is a flow chart showing the process of automatically adjusting content to fit on printed media.

FIG. 8 is a flowchart showing the steps of the process. The process is started in box 300 when the user submits a print job. On a computer 400 implementing the capabilities of the system, the user is presented with an option to "Print on Template" in box 302. If the user declines the selection of the auto fit function, control proceeds to 320, where the process is stopped and control is returned to the printer driver, for printing of the document in the normal way. If the user does select the auto fit function, control proceeds to box 304, where the user selects the template size and, in 306, scans the pre-printed media 100 on which the user desires to place the content. In an alternative embodiment, the user may be prompted for a file name of a document containing a soft copy of pre-printed media 100, such as in the case where a soft copy of the pre-printed media exists on computer 400. In box 308, the sizes of the header, footer, margins and printable area of the pre-printed media are calculated. At 310, it is determined if a scaled version of the document would be legible when scaled to fit into the printable area 106 of the pre-printed media 100. If this determination is made, content 120 is scaled in box 312 resulting in resized content 120'. At 314, the user selects the tray with the preprinted media and at 316 the combination of the pre-printed media and the user's content is printed, after which the process is stopped at 320 and control is returned to the printer driver.

If, at 310 it is determined that the scaled version of the document would be illegible, the second embodiment is selected at 318, in which the user's content 120 is cropped and thereafter rearranged to fit the cropped content 122, 124 on multiple pages. The process then proceeds to 314 and proceeds as described above.

The features and functions of the system, as well as alternative embodiments disclosed herein may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A document production system comprising:
    a scanner that is equipped with a motor which rotates a medium to be scanned around an axis;
    a printer; and
    a computing device, including a processor, configured to perform the functions of:
    causing the scanner to scan a soft copy template corresponding to the pre-printed media,
    determining, based on the soft copy template, a page margin of the pre-printed media, the page margin comprising a side margin, a header or a footer,
    wherein the determining comprises:
    (a) identifying a first variation in the intensity of light detected by a scan head of the scanner;
    (b) identifying an angle that the motor has rotated the pre-printed media when the first variation is detected and calculating a linear distance therefrom; and (c) providing a first offset of the linear distance from the top of the pre-printed media and marking the first offset as unprintable, determining, based on the page margin, a printable area of the pre-printed media, re-scaling content of the document such that the content is configured to fit into the printable area of the pre-printed media, and causing the printer to print the re-scaled content of the document in the printable area of the pre-printed media.

2. The system of claim 1, wherein the computing device is further configured to prompt a user of the document production system to insert the pre-printed media into the scanner.

3. The system of claim 1 wherein the determining further comprises:

(d) identifying a second variation in the intensity of light detected by a scan head of the scanner;

(e) identifying the angle that the motor has rotated the pre-printed media when the second variation is detected and calculating a linear distance therefrom; and (f) providing a second offset starting at the linear distance from the top of the pre-printed media and extending to the bottom of the pre-printed media and marking the second offset as unprintable.

4. The system of claim 1 wherein the function of determining the page margin of pre-printed media further comprises using an image segmentation algorithm to discover an area in the soft copy template having pre-printed markings.

5. The system of claim 1 wherein the function of determining the page margin of pre-printed media further comprises using a projection profile based algorithm to discover an area having pre-printed markings.

6. The system of claim 1 wherein the document has one or more pages and further wherein the function of re-scaling the content comprises:

scaling content for each page of the document to yield one or more scaled pages; and determining the legibility of scaled content on the scaled pages by determining a font size of the scaled content and determining whether the font size is greater than a minimum readable value.

7. The system of claim 6 wherein the function of re-scaling the content further comprises:

determining that the font size is greater than the minimum readable value; and printing the re-scaled content in the printable area of one or more pages of the pre-printed media.

8. The system of claim 6 wherein the font size is determined using connected component based segmentation.

9. The system of claim 6 wherein the document has one or more pages and further wherein the function of re-scaling the content further comprises:

(w) determining that the font size is less than the minimum readable value;

(x) ix cropping a page of the document such that a portion of the content from that page is fitted into the printable area of a pre-printed media;

(y) pushing remaining content from the page onto the printable area of a next page of pre-printed media;

(z) reducing the printable area of the next pre-printed media by the area taken up by the remaining content; and repeating steps (x)-(z) for each page in the document.

10. The system of claim 1 wherein:

the scanner and printer are combined into a multi-function device;

the system further comprises software resident in the multi-function device; and the software is configured to cause the computing device to perform the functions.

11. The system of claim 1 wherein:

the scanner and printer are combined into a multi-function device; and the computing device further comprises a driver for the multi-function device, the driver being configured to cause the computing device to perform the functions.

12. The system of claim 3 wherein the size of left and right margins of the template can be determined by rotating a copy of the pre-printed media 90 degrees and performing steps (a)-(f).

13. A document production system comprising:

a scanner;

a processor; and a printer;

wherein the document production system is configured to perform the functions of:

causing the scanner to scan a template comprising a pre-printed media;

determining, based on the scanned template, a page margin of the pre-printed media by discovering an area in the template having pre-printed markings, wherein the page margin comprises a side margin, a header or a footer, wherein the determining comprises:

(a) identifying a first variation in the intensity of light detected by a scan head of the scanner;

(b) identifying an angle that the motor has rotated the pre-printed media when the first variation is detected and calculating a linear distance therefrom; and (c) providing a first offset of the linear distance from the top of the pre-printed media and marking the first offset as unprintable, determining, based on the page margin, a printable area of the pre-printed media, re-scaling content of the document such that the content is configured to fit into the printable area of the pre-printed media, and causing the printer to print the document in the printable area of the pre-printed media.

14. A method of printing a document in a document production system comprising:

receiving, by a processor, a request from a user to print a document on a pre-printed media;

obtaining, by a scanner having a motor, a soft copy template corresponding to the pre-printed media;

determining, by the processor, based on the soft copy template, a page margin of the pre-printed media comprising a side margin, a header and a footer, wherein the determining comprises;

(a) identifying a first variation in the intensity of light detected by a scan head of the scanner;

(b) identifying an angle that the motor has rotated the pre-printed media when the first variation is detected and calculating a linear distance therefrom; and (c) providing a first offset of the linear distance from the top of the pre-printed media and marking the first offset as unprintable;

determining, by the processor, based on the page margin, a printable area of the pre-printed media;

re-scaling, by the processor, content of the document such that the content is configured to fit into the printable area of the pre-printed media; and printing, by a printer, the re-scaled content of the document in the printable area of the pre-printed media.

15. The method of claim 14, wherein determining the page margin of the pre-printed media further comprises using an image segmentation algorithm to discover an area in the soft copy template having pre-printed markings.

16. The method of claim 14, wherein determining the page margin of the pre-printed media further comprises using a project profile based algorithm to discover an area in the soft copy template having pre-printed markings.

\* \* \* \* \*